United States Patent [19]

Matsuo et al.

[11] Patent Number: 5,354,441
[45] Date of Patent: Oct. 11, 1994

[54] COATING COMPOSITION AND PROCESS FOR THE PRODUCTION OF COATED METAL ARTICLE

[75] Inventors: Katsuhiko Matsuo, Ibaraki; Akio Ikehira, Kobe; Takeshi Kuninori, Sakai, all of Japan

[73] Assignee: Shinto Paint Co., Ltd., Amagasaki, Japan

[21] Appl. No.: 96,860

[22] Filed: Jul. 26, 1993

Related U.S. Application Data

[63] Continuation of Ser. No. 600,985, Oct. 23, 1990, abandoned.

[30] Foreign Application Priority Data

Oct. 30, 1989 [JP] Japan ................... 1-282508

[51] Int. Cl.$^5$ ............................................. C25D 13/00
[52] U.S. Cl. ........................... 204/181.1; 427/388.1; 427/388.2; 427/409
[58] Field of Search ................... 204/181.1; 427/388.1, 427/388.2, 409

[56] References Cited

U.S. PATENT DOCUMENTS 4,500,399  2/1985  Hart et al. .................. 204/181.1

FOREIGN PATENT DOCUMENTS 40035    4/1978  Japan .................. 204/181.1
201488   8/1989  Japan .

*Primary Examiner*—John Niebling
*Assistant Examiner*—Kishor Mayekar
*Attorney, Agent, or Firm*—Wenderoth, Lind & Ponack

[57] ABSTRACT

Coating composition containing a resin and fine particles of an electrically semiconductive substance, whereby a coating film to be formed therefrom on a work article surface exhibits a varistor property represented by the following equation (1):

$$I=(V/V_1)^n \quad (1)$$

wherein I is a current density (mA/cm$^2$); $V_1$ is a voltage at which a current of 1 mA begins to flow when a voltage applied to the coating film is increased; V is an applied voltage; and n is an exponent showing the nonlinearity between I and V and is 1.5 or more. Coating films formed from such coating composition exhibit excellent film forming and corrosion-resistant properties.

8 Claims, No Drawings

COATING COMPOSITION AND PROCESS FOR THE PRODUCTION OF COATED METAL ARTICLE

This application is a continuation of now abandoned application, Ser. No. 07/600,985, filed Oct. 23, 1990.

BACKGROUND OF THE INVENTION (1) Field of the Invention

The present invention relates to a coating composition which provides a coating film to be formed on a work article surface, exhibiting a varistor property with respect to electrical characteristics and to a process for production of a coated metal article having said composition applied on a metal article and exhibiting high property of electrodeposition coating, corrosion resistance, forming property, and surface treatment property.

(2) Description of the Prior Art

Hitherto, with respect to the coating of general industrial articles, especially automobile body components, cationic or anionic electrodeposition coating has been widely used because of advantages thereof such as superior uniformity in thickness of the resulting coating film, throwing property, and corrosion resistance. However, even the electrodeposition coating is not always almightly. For example, in electrodeposition coating of non-treated steel plates, aluminum articles, zinc-plated articles, zinc alloy-plated steel plates, etc., because of high activity of a work article surface, there are caused disadvantages such as surface roughening and formation of pinholes on a coating film to be formed and, therefore, it has been required to undergo any pretreament or precoating.

In particular, in order to meet a requirement for improving the corrosion resistance which is highly advanced from year to year, there have been made various designs regarding steel plates for automobile body.

For example, a precoated steel plate known as a name of zincrometal, comprising a stell plate on which a zinc-rich paint with corrosion resistance has been previously applied; a zinc alloy-plated steel plate comprising a steel plate plated with zinc or a zinc alloy comprising zinc and one or two or more of Al, Fe, Mo, Co, Cr, etc.; and a composite coated steel plate prepared by subjecting the foregoing zinc alloy-plated steel plate to a chromate treatment and then applying thereon an organic coating film containing colloidal silica in a thickness of about 1 micron are put into practical use.

In painting automobiles, these coated steel plates are formed, assembled into body shapes or component articles, subjected to cationic or anionic electrodeposition coating, and then completed by intermediate coating and top coating for bodies or by rust-prevention coating for component articles, respectively. In this case, the zincrometal involved such a defect that because of zinc dust to be contained in a large quantity, a coating film to be formed is brittle so that a problem arises at the time of forming, while the zinc alloy-plated steel plate involved such a defect that because of its surface activity, a coating film to be formed likely causes surface roughening and formation of pinholes. Furthermore, the composite coated steel plate which has been developed in order to overcome these defects and achieve high corrosion resistance involved such a defect that since a coating film to be formed is electrically insulative, in order to obtain a good property of electrodeposition coating in the electrodeposition coating to be subsequently carried out, the coating film must have a film thickness of $1 \pm 0.3$ microns, whereby a large number of management steps are required for the production so that even a slight dispersion variation of the film thickness results in deterioration of the property of electrodeposition coating. In any of these cases, it is the present status that an immediate improvement is demanded.

There have been made investigations based on an assumption that the above-described property of electrodeposition coating could be improved by imparting electrical conductivity to coating films to be formed in these coated steel plates involving such defects. As a result, it has become revealed that in the case of applying a coating composition to which electrical conductivity has been imparted on a steel plate, since electrical conductivity is imparted to a coating film to be formed therefrom, the subsequent property of electrodeposition coating is improved, whereby even when a some dispersion variation in the film thickness of the coating film is present, it is possible to undergo electrodeposition coating, resulting in formation of a good electrodeposition coating film.

However, the above-described coating film formed on such a steel plate always exhibits electrical conductivity. That is, the aforesaid coating film exhibits electrical conductivity not only at the time of electrodeposition coating but also after the formation of an electrodeposition coating film. For this reason, it has become clear that since a slight amount of a current readily flows even at such a low voltage as the corrosion potential to promote the corrosion, a highly corrosion-resistant coating film required in, e.g., automobile bodies, cannot be obtained.

SUMMARY OF THE INVENTION

Accordingly, the present inventors have made further investigations based on the thinking that a coating film formed on a steel plate exhibits electrical conductivity under a high voltage at the time of electrodeposition coating to be subsequently carried out but does not exhibit electrical conductivity after the electrodeposition coating, while a coating film having such a characteristic as exhibiting a high resistance value can overcome the above-described problems. As a result, it has been found that if the above-described coating film exhibits a varistor property represented by the following equation (1):

$$I = (V/V_1)^n \qquad (1)$$

wherein I is a current density (mA/cm$^2$); V$_1$ is a voltage at which a current of 1 mA begins to flow when a voltage applied to the coating film is increased; V is an applied voltage; and n is an exponent showing the nonlinearity between I and V and is 1.5 or more, the coating film exhibits the foregoing characteristics, leading to accomplishment of the present invention.

DETAILED DESCRIPTION OF THE INVENTION

That is, the present invention is concerned with a coating composition which contains a resin and fine particles of an electrically semiconductive substance, a coating film to be formed therefrom on a work article surface exhibiting a varistor property represented by the foregoing equation (1).

Further, the present invention is concerned with a process for production of a coated metal article, which comprises applying the above-described coating composition in a dry film thickness of from 0.5 to 20 microns on a metal plate and/or a metal formed article with or without having been subjected to a surface treatment and then drying or baking at a temperature of from room temperature to 300° C.

Still further, the present invention is concerned with a method for further subjecting the formed coating film to electrodeposition coating.

Since the composition and coating film formed therefrom according to the present invention have the above-described electrical characteristics, if the above-described coating composition is applied on the treated or non-treated surfaces of steel plates, steel articles or plated articles thereof, aluminum, zinc, or zinc alloy articles, not only the characteristics of electrodeposition to be subsequently carried out are markedly improved, but also superior corrosion resistance and forming property can be imparted.

Furthermore, in addition to imparting the above-described characteristics of electrodeposition, by the use of the electrical characteristics, the coating film according to the present invention is possibly utilized as a coating type varistor material in not only the chemical industry but also other industrial fields including steel industry, electrical industry, and mechanical industry. Accordingly, a material on which the composition of the present invention is to be applied to form a coating film is not limited to the above-described metal articles but includes the above-described various materials in the industrial fields.

The varistor property as referred to in the present invention means a characteristic of a non-linear resistor whose resistance value greatly changes depending on the applied voltage. In another word, the current amount greatly changes depending on the applied voltage, i.e., there is an electrical characteristic that though a current does not usually flow when the resistance is large, a current flows first when the voltage reaches a specific voltage (varistor voltage) or more. Such a voltage-current characteristic of varistor is generally represented by the following equation:

$$I=(V/V_1)^n \text{ or } I=(KV)^n (K:1/V_1 \text{ constant}) \quad (1)$$

wherein:
I: current (unit: mA/cm$^2$)
V: applied voltage of varistor (unit: V)
n: voltage-current non-linear coefficient (n≧1.5)
$V_1$: coefficient or voltage at which a current of 1 mA begins to flow (accordingly, there may be a case of $1/V_1=K$)

In this equation, $V_1$ is a voltage at which the current rapidly increases, and its range is defined depending on the purpose. In the case of a coated steel plate as described above, in order that in forming a coating film according to the composition of the present invention on a work steel plate and then subjecting the coating film to electrodeposition coating, not only the property of electrodeposition coating is good, but the corrosion resistance is high, $V_1$ is preferably in the range of from 20 to 200 V. If $V_1$ is less than 20 V, the current readily flows even at a low voltage so that the corrosion current is easy to flow. On the other hand, if $V_1$ exceeds 200 V, such is not preferred because a current necessary for the electrodeposition does not flow. n is 1.5 or more, preferably large as 3 or more. That is, if n is less than 1.5, the voltage-current characteristic is close to a straight line, whereby a current to generate the corrosion flows at a low voltage. Though the non-linearity is more emphasized as n is large, if n is 3 or more, a non-linearity which does not cause a harm in the practical use can be revealed.

V is an applied voltage range, and its range is defined depending on the purpose. At the time of electrodeposition coating to be subsequently carried out on the aforesaid coated steel plate, V is usually from 40 to 500 V, preferably from 50 to 450 V.

As the fine particles of an electrically semiconductive substance to be used in the present invention, any substance to impart a varistor property to a coating film can be used without limitations. Examples include molybdenum disulfide and tri-iron tetroxide. But, from the standpoint of meeting the range represented by the equation (1) wherein the varistor property is revealed, molybdenum disulfide is optimum and gives rise to satisfactory results from the standpoints of the property of electrodeposition coating and of the corrosion resistance.

The content of the fine particles of an electrically conductive substance and/or an electrically semiconductive substance per 100 parts by weight of the solids content of the coating composition varies depending on the purpose of use but is usually from 5 to 70 parts by weight, preferably from 10 to 50 parts by weight, for the purpose of production of a coated steel plate. That is, if this content is less than 5 parts by weight, even when the applied voltage is increased, a necessary current does not flow into the formed coating film so that it is difficult to form an electrodeposition coating film on a coated steel plate. On the other hand, if it exceeds 70 parts by weight, the physical properties of coating film tend to be deteriorated.

As the resin for dispersing these fine particles, any resin which is generally used in coating compositions can be used without particular limitations. In the case of use in the production of a coated steel plate, blocked isocyanate cured epoxy resins, melamine cured oil-free polyester resins, melamine cured linear polyester resins, amide cured epoxy resins, melamine cured acrylic resins, blocked isocyanate cured epoxy and oil-free polyester mixed resins, blocked isocyanate cured epoxy ester resins, etc. are particularly suitable.

Besides, as a matter of course, pigments and additives which are used in usual paints, such as rheology control agents (e.g., colloidal silica and bentonite), color pigments, leveling agents, anti-sugging agents, anti-bubbling agents, dispersing agents, anti-settle agents, and anti-blocking agents (e.g., polyethylene waxes), can be used within a range wherein the characteristics of coating film are not deteriorated.

The fine particles of an electrically semiconductive substance of the composition according to the present invention are dispersed in a usual paint dispersing machine such as a ball mill, a scale mill, an attritor, a sand mill, and a roll mill to prepare a milled base which is then added with the resin and additives, etc., followed by adjusting with an organic solvent so as to have a proper viscosity.

As the organic solvent which can be used, solvents to be used in usual paints, such as aromatic hydrocarbon solvents, aliphatic hydrocarbon solvents, ketone solvents, ester solvents, and ether solvents can be used singly or in admixture without limitations.

As the work metal which can be used in the production process, steel or steel materials having various platings provided thereon, and non-ferrous metals such as aluminum and zinc can be used. In particular, examples of the steel plate include a cold rolled steel plate, a cold rolled dull steel plate, and a laser rolled dull steel plate; and examples of the plated steel plate with good corrosion resistance include a nickel-zinc alloy-plated steel plate, an iron-zinc alloy-plated steel plate, and an aluminum-zinc alloy-plated steel plate. Among them, the nickel-zinc alloy-plated steel plate preferably has a nickel content of from 5 to 20% by weight. Further, the iron-zinc alloy-plated steel plate preferably has an iron content of from 5 to 35% by weight. As the plating method of these alloy-plated steel plates, any of methods which are generally employed, such as an electrolysis method, a vapor phase method, and a hot dipping method, can be employed, and the plating metal quantity is 1 g/m$^2$ or more, preferably from 10 to 60 g/m$^2$ per side.

As the pretreatment which can be applied to the work metal, while, as a matter of course, a degreasing step for removing oils and fats or dusts attached before the coating is employed, with respect to aluminum, a chromate pretreatment or an anodically oxidizing film forming treatment may be employed, and with respect to a steel metal, an iron phosphate treatment or a zinc phosphate treatment may be employed, respectively. In particular, in a zinc alloy-plated steel plate with good corrosion resistance, a pretreatment with a chromate conversion coating solution as described below in detail is suitable.

The chromate conversion coating solution contains a partly reduced chromic acid solution as a principal component and has a $Cr^{+3}/Cr^{+6}$ proportion of from 1/3 to 1/1 and a pH of from 1.5 to 4.0, preferably from 2.0 to 3.0. As the treatment method, any of conventionally employed methods such as a roll coating method, a dipping method, and a spraying method can be employed.

The work metal is applied with the coating composition according to the present invention in a dry film thickness of from 0.5 to 20μ, preferably from 1 to 5μ. Any of conventionally employed methods such as a roll coater coating method, a spray coating method, and a static coating method can be employed as the coating method, but in a precoated metal, a roll coater coating method is the most suitable because of the coating speed as well as uniformity of the dried coating film. In the case that the dry film thickness is less than 0.5μ, an improvement in the corrosion resistance to be brought by the coating cannot be expected. On the other hand, if it exceeds 20μ, the electrical supply is so poor that the electrodeposition property is deteriorated. The coating film is dried or baked under the conditions that the temperature (temperature of a material to be coated) is from room temperature to 300° C., preferably from 20° to 250° C. In particular, in the case of treating the above-described zinc alloy-plated steel plate with a chromate conversion coating solution, the temperature is preferably in the range of from 100° to 250° C. That is, if the temperature is lower than 100° C., the chemical reaction of the chromate layer is insufficient, the degree of crosslinking of the coating film is low, and a good corrosion resistance cannot be expected. Further, if the temperature exceeds 250° C., cracks are generated in the chromate coating film, and $Cr^{+6}$ decreases, whereby the corrosion resistance is lowered.

The work metal having formed thereon a coating film according to the coating composition of the present invention can be usually subjected to electrodeposition coating after the forming processing as described above.

The electrodeposition coating can be carried out in a manner exactly the same as in the usual electrodeposition coating method. For example, the coating can be carried out without limitations by means of anionic electrodeposition with a polycarboxylic acid resin or cationic electrodeposition with an amine-modified epoxy resin, an amine-modified polyurethane polyol resin, or an amine-modified polybutadiene resin.

With respect to the electrodeposition condition at the time of coating, there are no particular limitations. Usually, a current is supplied at a voltage of from 40 to 500 V for from 2 to 5 minutes, and an electrodeposition coating film thus formed is baked at from 100° to 200° C. for from 20 to 30 minutes to complete the coating film.

EXAMPLES

The present invention will be described with reference to Examples and Comparative Examples. As a zinc alloy-plated steel plate, an Ni-Zn alloy-plated steel plate (Ni content: 11% by weight, one-side layer plating metal quantity: 30 g/m$^2$) having a thickness of 0.8 mm was used. This steel plate was degreased with an alkali, rinsed with water, dried, and then applied with a chromate conversion coating solution as described later. After drying, each of coating compositions of Examples and Comparative Examples as shown in Table 1 below was applied on the steel plate. After drying under a prescribed condition, the resulting steel plate was provided for tests of property of electrodeposition coating as well as of corrosion resistance and forming property. The results are shown in Table 2. The various conditions in each of the Examples and Comparative Examples are shown below.

Example 1

(i) Formulation and Production Method:

| | |
|---|---|
| MoS$_2$ ("Moly Powder PS" made by Sumico Lubricant Co., Ltd.) | 34.2 weight parts |
| SiO$_2$ ("Mizukasil P-526" made by Muzusawa Industrial Chemicals, Ltd.) | 0.5 weight part |
| Epoxy resin ("EP-1009" made by Shell Chemical Co., Ltd.) | 33.5 weight parts |
| Dicyandiamide (hardener) | 0.7 weight part |
| Butyl cellosolve | 35.0 weight parts |
| Methyl ethyl ketone | 49.1 weight parts |
| Dispersing agent | 0.15 weight part |
| Total | 153.15 weight parts |

First of all, the compounding components 3 to 6 were mixed and stirred for dissolution to prepare a resin solution. The compounding components 1 and 2 were then added to the resin solution and dried. Glass beads were added to the mixture in a ball mill for the experimental purpose, dispersed for 45 minutes to one hour, filtered, and then provided for the tests.

Examples 2 to 5 and Comparative Examples 1 to 7

The formulation of each of Examples 2 et seq is shown in Table 1. The production methods of Examples 2 to 5 and Comparative Examples 1 to 5 were according to that of Example 1. However, in Comparative Example 5, zinc dust was added to the resin solution and stirred until the system became uniform, and then provided for the tests.

(ii) Formulation of Chromate Conversion Coating Solution:
Zincrome R1415A
Chromium ratio ($Cr^{+3}/Cr^{+6}$):3/4
Solids content: 25 g/l
pH:2.5 (adjusted with KOH)

(iii) Property of Electrodeposition Coating:

A cationic electrodeposition paint, Succed #700 Grade (made by Shinto Paint Co., Ltd.) was adjusted so as to a solution concentration of 18% by weight, subjected to electrodeposition coating at 28° C. and at 200 V for 3 minutes, and then baked and dried at 170° C. for 20 minutes. The surface appearance was then observed.

The evaluation was made by the following ratings.

A: film thickness uniformity $1\mu>$, good smoothness
B: film thickness uniformity $2\mu>$, good smoothness
C: film thickness uniformity $3\mu>$, slightly inferior smoothness
D: The coating film is non-uniform, the formation of pinholes is observed, and non-coated portions are observed.

(iv) Corrosion Resistance:

After coating under the conditions as described in (iii) above such that the electrodeposition coating film thickness was $20\pm1\mu$, the resulting steel plate was provided with cross-cuts and placed in a salt spray testing machine (5% NaCl spray, test temperature: 35° C.). Eight hundreds and forty hours later, the generation of rust in the processed portions (bent at 90° with 10 mmR) and the planar portions was observed.

A: The coating film did not at all change.
B: While the generation of rust was observed in the cross-cut portions, the coating film did not change.
C: A blister or rust with a width of 3 mm was observed in the cross-cut portions, and several blisters were observed in the planar portions.
D: Contamination of rust was likely observed, and blisters were generated.
E: Generation of blister and rust was observed on the entire surface.

(v) Forming Property:

7.0 mm of the coated steel plate was extruded by an Erichsen film tester in a thermostat of 20° C., and cellophane adhesive tapes were press bonded to both of the front and back sides thereof and immediately thereafter, peeled apart. Thus, the peeled state of the resulting coating film was evaluated by 5 ratings.

(vi) Varistor Property

Each of compositions of Examples 1 to 5 and Comparative Examples 1 to 7 having a formulation as shown in Table 1 was diluted with an organic solvent, and the solution was applied on a $0.2\times100\times100$ mm aluminum plate by means of a bar coater in a dry film thickness of $5\mu$, followed by baking at 210° C. for 60 seconds to prepare a test specimen. This test specimen was installed in a resistivity cell, YHP1608A (made by Yokogawa-Hewlett-Packard, Ltd.) and examined for the voltage-current characteristic at an applied voltage in the range of from 0 to 100 V by means of a semiconductor parameter analyzer ("YHP4145B" made by Yokogawa-Hewlett-Packard, Ltd.). The n value in the equation (1), $I=(V/V_1)^n$ was calculated, and if n was 1.5 or more, the varistor was determined to be found, whereas if n was less than 1.5, the varistor was determined to be not found.

TABLE 1

| Item | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 | Com. Ex. 7* |
|---|---|---|---|---|---|---|---|---|---|---|---|---|
| Fine particles of electrically conductive substance or electrically sumiconductive substance | $MoS_2$ | $MoS_2$ | $MoS_2$ | $MoS_2$ | $MoS_2$ | ZnO | $SnO_2$ | graphite | electrically conductive carbon | zinc dust | — | |
| Fine particle content (weight parts) | 50 | 30 | 30 | 30 | 10 | 30 | 30 | 30 | 30 | 80 | — | |
| $SiO_2$ (weight parts) | 0.7 | 0.7 | 0.7 | 0.7 | 0.7 | 0.7 | 0.7 | 0.7 | 0.7 | 0.7 | 0.7 | |
| Resin: | | | | | | | | | | | | |
| Epoxy resin ("EP-1009" made by Shell Chemical Co., Ltd.) | 48.1 | 67.7 | | | 87.3 | 67.7 | 67.7 | 67.7 | 67.7 | 18.9 | 97.3 | |
| Acrylic resin ("Dianal HR-686" made Mitsubishi Rayon Co., Ltd.) | | | 48.4 | | | | | | | | | |
| Polyester resin ("Beckolite 46-518" made by Dainippon Ink and Chemicals, Inc.) | | | | 48.4 | | | | | | | | |
| Hardener: | | | | | | | | | | | | |
| Melamine resin ("Sumimal 40S" made by Sumitomo Chemical Company, Limited) | | | 20.7 | 20.7 | | | | | | | | |
| Dicyandiamide ("Adeka Hardener HT-2844" made by Asahi Denka Kogyo K.K.) | 1.0 | 1.4 | | | 1.8 | 1.4 | 1.4 | 1.4 | 1.4 | 0.4 | 2.0 | |
| Pigment dispersing agent | 0.2 | 0.2 | 0.2 | 0.2 | 0.2 | 0.2 | 0.2 | 0.2 | 0.2 | — | — | |

*Zincrometal was used.
[Note]
i) All weight parts are calculated as the solids content.
ii) In any of Examples 1 to 5 and Comparative Examples 1 to 6, the coating composition was diluted with a solvent (comprising butyl cellosolve, methyl ethyl ketone, and xylene) so as to have a viscosity suitable for the coating and then provided for the tests.

TABLE 2

| | Film Thickness ($\mu$) | Property of Electro-deposition Coating | Corrosion Resistance | | Forming Property | | Varistor Property |
|---|---|---|---|---|---|---|---|
| | | | Planar Portion | Processed Portion | Front Side | Back Side | |
| Example 1 | 1 | A | B | B | 5 | 5 | found |
| | 5 | A | B | B | 5 | 5 | |
| | 15 | B | A | B | 5 | 5 | |
| Example 2 | 1 | A | B | B | 5 | 5 | found |
| | 5 | A | B | B | 5 | 5 | |
| | 10 | B | B | B | 5 | 5 | |
| Example 3 | 1 | A | B | B | 5 | 5 | found |
| | 5 | B | B | B | 5 | 5 | |
| Example 4 | 1 | A | B | B | 5 | 5 | found |
| | 5 | B | B | B | 5 | 5 | |
| Example 5 | 1 | B | B | B | 5 | 5 | found |
| | 5 | B | B | B | 5 | 5 | |
| Comparative Example 1 | 1 | A | D | E | 4 | 4 | not found |
| | 5 | A | C | D | 4 | 4 | |
| | 15 | B | C | D | 2 | 3 | |
| Comparative Example 2 | 1 | A | D | E | 4 | 4 | not found |
| | 5 | B | D | D | 4 | 4 | |
| Comparative Example 3 | 1 | A | C | D | 4 | 4 | not found |
| | 5 | B | C | D | 4 | 4 | |
| Comparative Example 4 | 1 | A | C | D | 4 | 4 | not found |
| | 5 | B | C | D | 4 | 4 | |
| Comparative Example 5 | 1 | A | B | C | 3 | 4 | not found |
| | 5 | B | B | D | 2 | 3 | |
| Comparative Example 6 | 1 | B | B | C | 4 | 4 | not found |
| | 5 | D | — | — | 3 | 4 | |
| Comparative Example 7 | 1 | A | A | D | 2 | 3 | not |

Next, Examples and Comparative Examples directed to non-ferrous metal plates other than the zinc alloy-plated steel plate are shown.

Examples 6 to 7 and Comparative Examples 8 to 9

A 0.8 mm-thick aluminum plate was subjected to a chromium chromate treatment and applied with the same composition as in Example 1 shown in Table 1 (Example 6) or the same composition as in Comparative Example 1 shown in Table 1 (Comparative Example 8). Further, a 0.8 mm-thick aluminum plate was subjected to a chromium chromate treatment, rinsed with water, dried, and then applied with the same composition as in Example 2 shown in Table 1 (Example 2) or the same composition as in Comparative Example 4 (Comparative Example 9). The coating method was one using a roll coater according to the coating method employed in the foregoing Examples and Comparative Examples for the zinc alloy-plated steel plate. The property of electrodeposition coating, corrosion resistance, and forming property were evaluated in the same manners as in the foregoing Examples and Comparative Examples for the zinc alloy-plated steel plate. With respect to the corrosion resistance, the filiform corrosion resistance was additionally evaluated under the conditions as shown in (vii) below. The results are shown in Table 3.

(vii) Filiform Corrosion Resistance

After coating under the conditions as described in (iii) above such that the electrodeposition coating film thickness was $20\pm 1\mu$, the resulting steel plate was provided with cross-cuts and placed in a salt spray testing machine (5% NaCl spray, test temperature: 35° C.). Twenty-four hours later, the steel plate was allowed to stand in a thermo-hygrostat (temperature: 50° C., humidity: 95% RH) for 2,000 hours. Thereafter, the steel plate was taken out and observed for the generation of filiform corrosion from the cross-cut portions.

A: The coating film did not at all change.
B: The generation of filiform corrosion was slightly observed from the cross-cut portions.
C: The generation of filiform corrosion was greatly observed from the cross-cut portions.

TABLE 3

| | Film Thickness ($\mu$) | Property of Electro-deposition Coating | Corrosion Resistance | | Filiform Corrosion Resistance | Forming Property | |
|---|---|---|---|---|---|---|---|
| | | | Planar Portion | Processed Portion | | Front Side | Back Side |
| Example 6 | 1 | A | B | B | A | 5 | 5 |
| | 5 | A | B | B | A | 5 | 5 |
| | 15 | B | A | B | A | 5 | 5 |
| Example 7 | 1 | A | B | B | A | 5 | 5 |
| | 5 | A | B | B | A | 5 | 5 |
| | 10 | B | A | B | A | 5 | 5 |
| Comparative Example 8 | 1 | A | C | D | B | 4 | 4 |
| | 5 | A | B | D | B | 4 | 4 |
| | 10 | B | B | D | B | 3 | 2 |
| Comparative Example 9 | 1 | A | B | C | B | 4 | 4 |
| | 5 | B | B | C | B | 4 | 4 |

In view of the foregoing, in accordance with the present invention, performances of the property of electrodeposition coating and the corrosion resistance which are opposite to each other can be satisfied by the varistor property of coating film. Furthermore, the coating composition of the present invention does not reply on the film thickness at the time of electrodeposition, can be applied in an allowable film thickness range of 10 times higher than that in the conventional techniques, is free from the defects seen in the conventional techniques, such as non-uniformity of the electrodeposition coating film and difficulty in management of the film thickness, and can be expected to have improvements in the forming property by molybdenum disulfide and rust prevention. Therefore, the present invention is suitable as a coating composition for coated metal articles and a process for production of the same.

What is claimed is:

1. A coating composition which contains a resin and fine particles of an electrically semiconductive substance present in amounts sufficient to impart varistor properties to coating films formed therefrom on a work article surface, said films formed therefrom exhibiting varistor properties represented by the following equation (1):

$$I=(V/V_1)^n \qquad (1)$$

wherein I is a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

2. A coating composition as in claim 1, wherein said fine particles of an electrically semiconductive substance are present in an amount of from 5 to 70 parts by weight per 100 parts by weight of the solids content of said coating composition.

3. A coating composition as in claim 1, wherein said electrically semiconductive substance is molybdenum disulfide.

4. A process for production of a coated metal article, which comprises applying a coating composition in a dry film thickness of from 0.5 to 20 microns on a metal plate or a metal formed article with or without having been subjected to a surface treatment and then drying or baking at a temperature ranging from room temperature to 300° C., said coating composition containing a resin and fine particles of an electrically semiconductive substance present in amounts sufficient to impart varistor properties to coating films formed therefrom, said films formed therefrom exhibiting varistor properties represented by the following equation (1):

$$I=(V/V_1)^n \qquad (1)$$

wherein I a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

5. A method comprising forming a coating film by the use of a coating composition and further subjecting said coating film to electrodeposition coating, said coating composition containing a resin and fine particles of an electrically semiconductive substance present in amounts sufficient to impart varistor properties to the coating film, said coating films exhibiting varistor properties represented by the following equation (1):

$$I=(V/V_1)^n \qquad (1)$$

wherein I a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

6. A coating composition which contains a resin and fine particles of molybdenum disulfide as an electrically semiconductive substance present in an amount of 5 to 70 parts by weight per 100 parts by weight of the solids content of said coating composition and sufficient to impart varistor properties to coating films produced therefrom on a work article surface, said films formed therefrom exhibiting varistor properties represented by the following equation (1):

$$I=(V/V_1)^n \qquad (1)$$

wherein I is a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

7. A process for production of a coated metal article which comprises applying a coating composition in a dry film thickness of from 0.5 to 20 microns on a metal plate or a metal formed article with or without having been subjected to a surface treatment and then drying or baking at a temperature ranging from room temperature to 300° C., said coating composition containing a resin and fine particles of molybdenum disulfide as an electrically semiconductive substance present in an amount of 5 to 75 parts by weight per 100 parts by weight of the solid content of said coating composition and sufficient to impart varistor properties to coating films produced therefrom, said films formed therefrom exhibiting varistor properties represented by the following equation (1):

$$I=(V/V_1)^n \qquad (1)$$

wherein I is a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

8. A method which comprises forming a coating film by the use of a coating composition and further subjecting said coating film to electrodeposition coating, said coating composition containing a resin and fine particles of molybdenum disulfide as an electrically semiconductive substance present in an amount of 5 to 75 parts by weight per 100 parts by weight of the solid content of said coating composition and sufficient to impart varistor properties to the coating film, said coating film exhibiting varistor properties represented by the following equation (1):

$$I=(V/V_1)^n \qquad (1)$$

wherein I is a current density (mA/cm$^2$); $V_1$ is a voltage at which a current of 1 mA begins to flow when a voltage applied to the coating film is increased; V is an applied voltage; and n is an exponent showing the non-linearity between I and V and is 1.5 or more.

* * * * *